July 30, 1968   W. E. KELLY   3,395,243
ROTATABLE FLOOR OUTLET BOX
Original Filed Sept. 17, 1964   2 Sheets-Sheet 1

INVENTOR.
WILLIAM E. KELLY
BY John Babie Jr.
ATTORNEY.

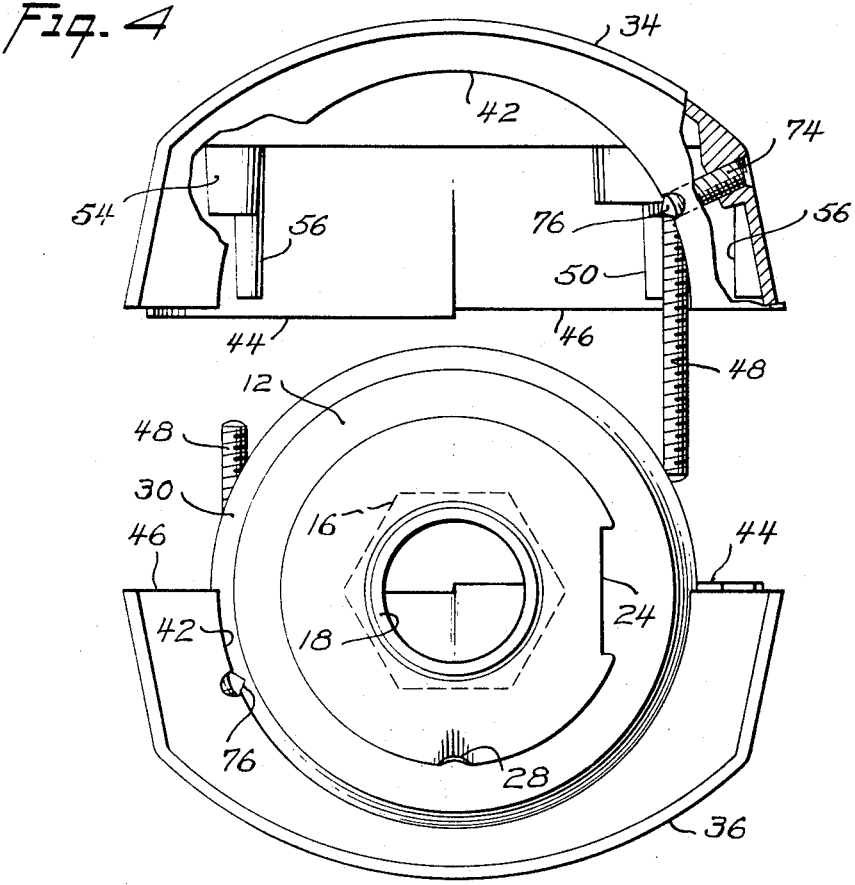
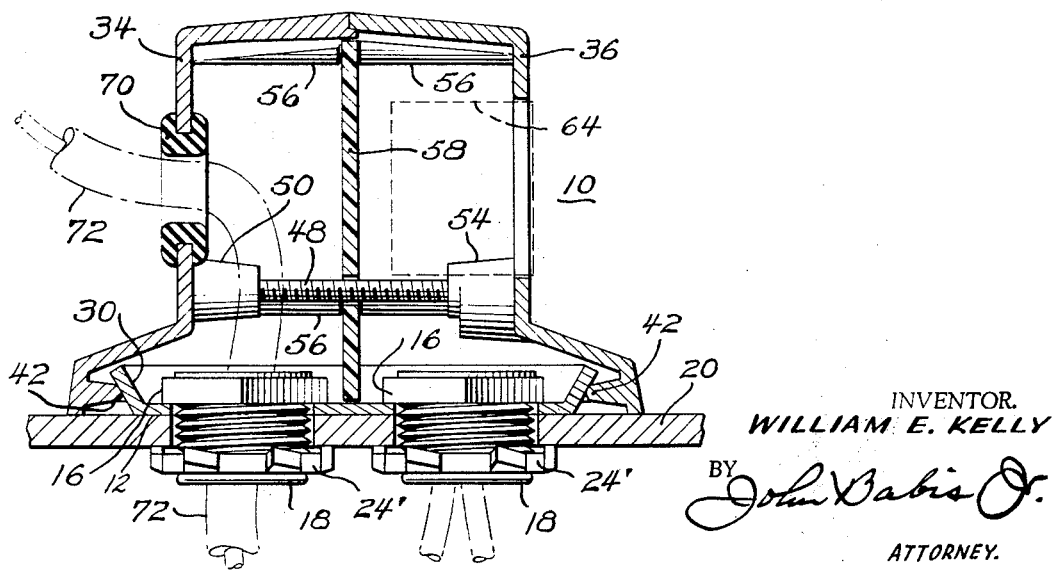

United States Patent Office 3,395,243
Patented July 30, 1968

1

3,395,243
ROTATABLE FLOOR OUTLET BOX
William E. Kelly, Bradley Beach, N.J., assignor to The Thomas & Betts Co., Inc., Elizabeth, N.J., a corporation of New Jersey
Continuation of application Ser. No. 397,150, Sept. 17, 1964. This application July 13, 1967, Ser. No. 654,316
8 Claims. (Cl. 174—48)

ABSTRACT OF THE DISCLOSURE

This invention relates to an electric outlet box to be secured to a floor or other surface by a base plate, with one or more outlets being disposed in the outlet box, the base plate and box being provided with complementary means enabling the box to be rotated on the base plate and rockably as well as rotatably adjusted thereon, and means being provided to secure it thereto at precisely the selected positions of adjustment.

*Rotatable floor outlet box*

Figure 1:
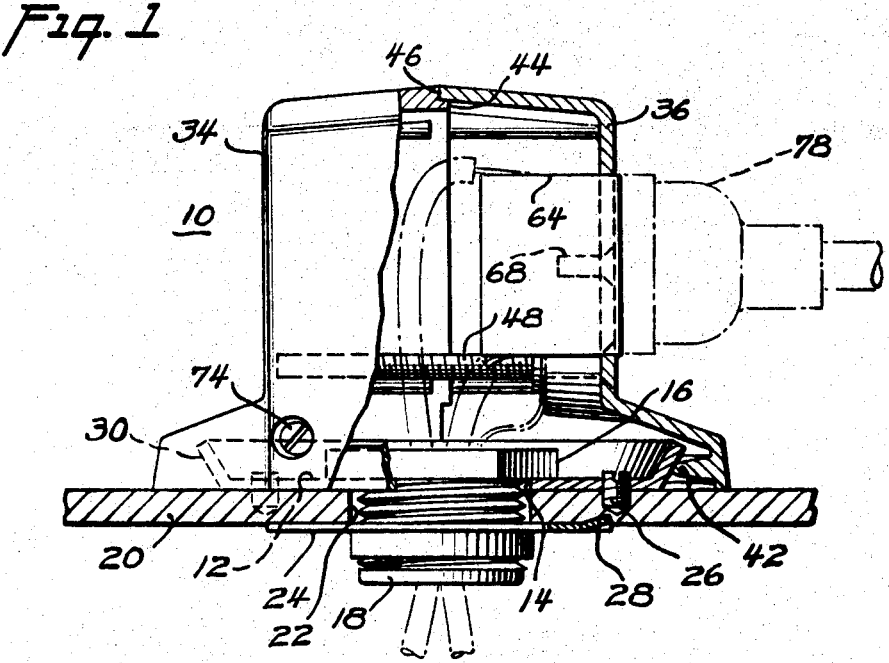

This application is a continuation of my copending application filed Sept. 17, 1964, Ser. No. 397,150, now abandoned.

The present invention relates to electric raceway systems and more particularly to a service outlet fixture or box adapted to be moved on a vertical or horizontal fixed surface and connected to the conductors usually contained in a concealed or exposed conduit or mounted on a junction box of the floor type or similar installation for angular rotation relative thereto.

The multi-outlet fixture or box of this invention may further be angularly adjusted or rotated on a fixed base relative to an electrically energized business machine or the lige, desk devices, telephone or other communication lines, whereby a conductor plug-in cord or connection may be made thereto in direct alignment with such machines, devices and communication lines.

Pursuant to the invention, means are provided enabling the outlet box to adjust to position at various desired angles relative to the base plate, and means enabling the outlet box to be fixed in position, after rotation or tilting thereof relative to the base plate, preventing further unwanted or accidental movement or displacement. Thus, great adaptability of adjustment of position is provided, plus means for fixing the box in selected position, while enabling it to be readily repositioned, when desired, by the user, on disengagement of the position fixing means.

It was necessary, in prior art systems, to disassemble the outlet box to reposition it; the outlet box of the present invention, however, may be repositioned without disassembly.

Heretofore, certain disadvantages were present in the installation of an electrically operable business machine, devices or the like in a floor area provided with a convenience service outlet, which may include a telephone or other communication line connection outlet; for example, the convenience service outlet often faced away from the machine, device or apparatus to be energized. Thus, it was desirable to alter, reposition or relocate the convenience outlet so as to face the installation in substantial alignment therewith so that a conductor cord will, when connected, extend in a substantially straight path therefrom to the convenience outlet, thus presenting an efficient, safe and pleasing appearance.

It is an object of the invention to provide a service outlet fixture of the character described which obviates the above noted disadvantages.

A further object of the invention is to provide a service outlet convenience fixture, which is angularly adjustable.

2

Another object of the invention is to provide a service outlet fixture which is simple in construction, readily installed and adjusted, and adapted for the multipurposes intended.

A further object of the invention is to provide an angularly adjustable service outlet fixture or box of the character described in which a communication system cable connection and a power supply outlet receptacle may be disposed in oppositely facing insulated relation.

Another object of the invention is to provide a service outlet fixture of the character described which is adapted to be adjusted angularly relative to a fixed base plate and subsequently secured in any position of adjustment.

A further object of the invention is to provide a service outlet convenience fixture of the character described, which, when installed on a fixed surface, forms its own annular track about which the fixture is adapted to be rotated and secured in a selected position.

Another object of the invention is to provide an adjustable service outlet fixture of the character described which comprises complementary half-section shells adapted to be bolted together on and about a flanged base plate therefor, for relative rotary movement thereon.

Figure 2:
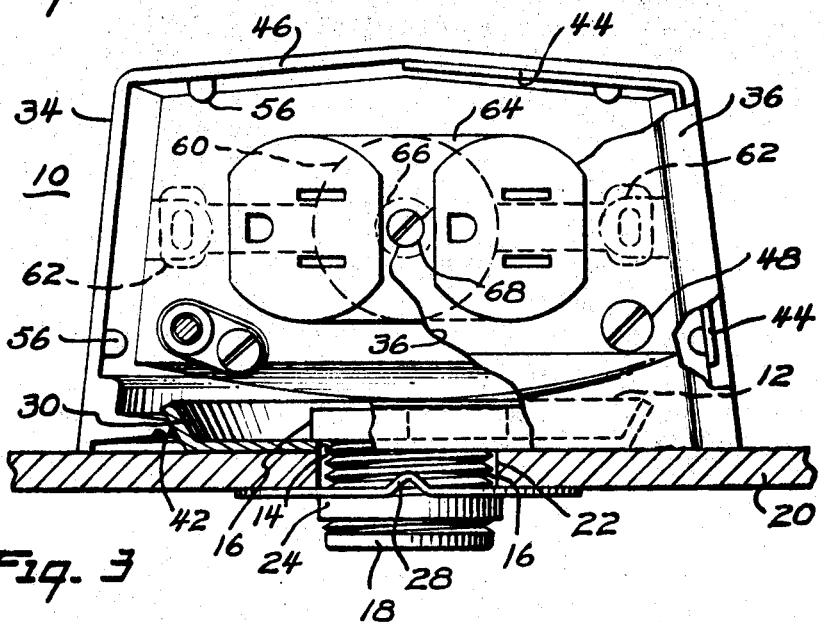
Figure 3:
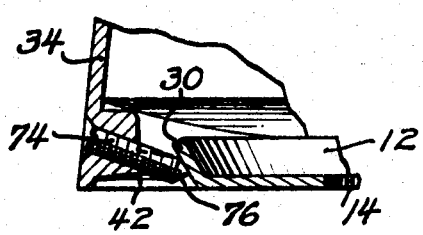

With the above and other objects in view, the invention resides in the novel construction, combination, and arrangement of parts, the novel features of which are set forth with particularity in the appended claims, the invention itself, however, both as to its organization and method of operation, together with additional objects and advantages thereof, being best understood from the following description of a specific embodiment thereof when taken in connection with the accompanying drawings, in which:

FIG. 1 is an end view, in elevation and partly in section, illustrating the manner of securing the rotatable service outlet fixture on a fixed surface, and a cord inserted therein, shown in broken lines, FIG. 2 is a front view, in elevation, with one-half section of the fixture partly broken away to illustrate the interior of the other half-section, FIG. 3 is a fragmentary sectional view, illustrating the manner in which the service outlet convenience fixture is secured against rotation relative to a fixed apertured base plate therefor, by means of a pair of adjustable set screws;

FIG. 4 is a bottom plan view of the service outlet fixture with an apertured base plate therefor shown in cooperable relation therewith, one half-section of the outlet fixture or box being partially separated therefrom, to illustrate the manner in which the respective half-sections are secured together on and about the base plate, and FIG. 5 is a transverse sectional view of the service outlet fixture or box, as assembled on its base plate, adapted for receiving the terminal ends of a pair of conduits therethrough, and illustrating the manner in which a communication cable outlet connection may be contained within the outlet fixture, in conjunction with a power supply outlet socket, with an insulation barrier therebetween, dividing the fixture into two compartments.

Referring to the drawings and to FIGS. 1, 2 and 5 in particular, the rotatable service outlet fixture or box generally indicated at 10 comprises a circular base plate 12 having a central clearance opening 14 therethrough for the reception of a conventional pipe nipple 16 therein which is provided with a plastic insulation sleeve or bushing 18, the nipple 16 having a hexagonal head end whereby it is adapted to be rotated to secure the base plate 12 on a fixed support or floor 20 in alignment with a raceway opening 22 therethrough by threading the opposite, externally threaded end of the nipple 16 into a conventional screw plate 24, held against the underside of the floor 20 in alignment with the opening 22. Relative movement of the base plate 12 and screw plate 24, upon tightening the nipple 16, is prevented respectively by a pair of suitable screws 26 threaded through the base plate 12, radially of its central opening 14 and extending part way into the fixed support or floor 20, and a V tooth or key 28 struck out of the plane of the screw plate 24 on its periphery, adapted to bite into the floor surface 20 in known manner.

Further in accordance with the invention, the base plate 12 is provided with an angular flange 30 about its peripheral edge portion extending upwardly from its central portion at an angle of 60 degrees whereby an annular, inclined track is formed between the base or pivot plate 12 and the fixed support or floor 20 for a purpose now to be described.

Further in accordance with the invention, the service outlet convenience fixture 10 includes a pair of die cast, complementary, shell-like half-sections 34 and 36 of suitable design and defining, when secured together in edge face abutment, a tapered, box-like enclosure having a substantially circular bottom portion with a large circular opening therein defined by a split, inwardly projecting annular flange 42 tapering in cross-section toward its opening defining edge and having an inside diameter smaller than the overall outside diameter of the angular flange 30 on the base plate 12.

As best shown in FIG. 4, the abutting margins of the box-like half-sections 34 and 36 are each partly provided with a rectangular stepped edge or lip 44 adapted to seat against the opposite remaining half of the plain edge portion 46 of each of the half-sections in complementary interlocked relation providing an externally smooth, dust free seam line between the half-sections 34 and 36 when secured together.

As best shown in FIG. 4, the half-sections 34 and 36 are secured together by means of a pair of machine screws 48 or the like which extend in opposite directions through a suitable apertured boss 50 formed within the section 34 and for engagement in a suitable screw threaded aperture in the opposite correlated boss 54 within section 36 as best shown in FIG. 5. Moreover, each half-section 34 and 36 is also provided with linear projections 56 on its inner top and side walls respectively which extend in parallelism short of the edge face of each half-section to provide spot abutments for an insulation panel or barrier 58 of suitable size and material which may, if desired, be positioned between the half-sections before securing the same together to form two compartments within the fixture 10 with the screws 48 extending through suitable openings in the panel 58, as clearly shown in FIG. 5.

Further in accordance with the invention and as best shown in FIG. 2, the front face of at least one of the half-sections 34 and 36 is provided with either one opening for a conventional single outlet receptacle indicated at 60 in which case the usual metal end extensions thereon are brought against a pair of aligned pads 62 through which suitable holes may be drilled for securing the same in place in the half-section by means of suitable screws, or a dual outlet receptacle 64 secured against an intermediate or central pad 66 by means of the screw 68.

The opposite half-section may be provided with a smaller central opening for the reception of a suitable grommet 70 (see FIG. 5) of rubber or the like for the extension therethrough of a communication system cable 72. In cases as just described, the base plate 12 is provided with two side by side openings for the reception of two of the nipples, as indicated at 16 in FIG. 1, for the separate extension therethrough of the cable 72 and usual power line conductors for the outlet receptacle 64, as clearly shown in FIG. 5. Each of the nipples 16 may be provided with separate screw plates 24' or a single screw plate as at 24 in FIG. 1 may be employed.

Accordingly, when the base plate 12 has been secured to a fixed support 20 as aforesaid, the half-sections 34 and 36 are assembled thereon about its angularly flanged peripheral portion 30 and secured together by means of the screws 48 whereby the flange 42 within the joined half-sections 34 and 36 freely engages the underside of the angular flange 30 of the base plate 12 whereby the outlet fixture 10 is pivotally mounted on the fixed support 20 (see FIG. 5), and secured thereon in a selected position by means of a pair of headless set screws 74 each having a pointed end 76 adapted to match the 60 degree angle of the flange 30 on the base plate 12 when threaded slightly downwardly through the side of each half-section 34 and 36 and emerging inwardly thereof just above the top side of the inner flange 42 therein as best shown in FIG. 3, whereby the outlet fixture 10 is locked to the fixed support 20 in any position of angular adjustment to suit a power supply cord 78 extended in a straight line to the service outlet fixture as clearly shown in FIG. 1.

The set-screws 74 adjustment arrangement also permits the box to tilt with respect to the base 12, to match the floor level and contour; thus the box may seek its own level, and may be fixed in the position at that level. A further feature of the invention is the provision of a ground terminal for each compartment.

While the foregoing disclosure of exemplary embodiments is made in accordance with the patent statutes, it is to be understood that the invention is not limited thereto or thereby, the inventive scope being defined in the appended claims.

I claim:

1. A fixture for positioning a service outlet with respect to a mounting surface comprising: a mounting member adapted to be fixedly secured to a mounting surface, said mounting member having a base portion extending along the plane of a mounting surface and a track portion extending outwardly from said base portion at a predetermined angle thereto; said track portion being dimensioned so as to have its smallest diameter at the jointure of said base portion and said track portion and a larger diameter at the free end of said track portion; a housing means having at least one first opening therein to receive a service outlet; said housing means having a second opening therein; rib means adjacent said second opening of said housing means defining a surface complementary with said track portion and limiting said second opening to a diameter greater than the smallest diameter of said track portion but less than the diameter of the track portion at its free end; whereby the assembly of said mounting member through said second opening of said housing means to a mounting surface causes said rib surface to contact said track portion permitting the positioning of said housing means with respect to said mounting surface.

2. A fixture for positioning a service outlet with respect to a mounting surface as defined in claim 1, wherein said housing means comprises two complementary sections arranged to be assembled into a unitary housing means by means of fastening means.

3. A fixture for positioning a service outlet with respect to a mounting surface as defined in claim 2 further including insulating means positioned between the two complementary sections of said housing means for partitioning said housing means into at least two chambers isolated from one another.

4. A fixture for positioning a service outlet with respect to a mounting surface as defined in claim 1 wherein said rib means is formed integrally with said housing means and adjacent the base thereof, said rib means acting to cause the capture of said housing means by said mounting member when assembled but permitting the rotation and tilting of said housing means with respect to said mounting member.

5. A fixture for positioning a service outlet with respect to a mounting surface as defined in claim 1, further including locking means whereby the housing means may be locked against further movement upon completion of the desired positioning of said housing means with respect to said mounting surface, and unlocked to permit desired repositioning.

6. A fixture for positioning a service outlet with respect to a mounting surface as defined in claim 5 wherein said locking means comprises at least one screw having a surface complementary to said predetermined angle of said track portion and engageable with said track portion whereby said housing means may be positioned with respect to an intermediate surface without regard for said mounting surface.

7. A fixture for positioning a service outlet with respect to a mounting surface as defined in claim 1, wherein said mounting member has at least one opening therein to permit the passage of at least one conductor therethrough for coupling to a service outlet placed in said first opening.

8. A fixture for positioning a service outlet with respect to a mounting surface as defined in claim 1 further including at least one grounding terminal within said housing means.

References Cited
FOREIGN PATENTS 369,805    7/1963    Switzerland.

LARAMIE E. ASKIN, *Primary Examiner.*